United States Patent
Swofford et al.

(10) Patent No.: US 7,806,543 B2
(45) Date of Patent: Oct. 5, 2010

(54) LIGHT SYSTEM FOR A TEMPERATURE CONTROLLED CASE

(75) Inventors: Timothy Dean Swofford, Midlothian, VA (US); Larry C. Howington, Chesterfield, VA (US)

(73) Assignee: Hill Phoenix, Inc., Conyers, GA (US)

( * ) Notice: Subject to any disclaimer, the term of this patent is extended or adjusted under 35 U.S.C. 154(b) by 342 days.

(21) Appl. No.: 11/968,477

(22) Filed: Jan. 2, 2008

(65) Prior Publication Data

US 2008/0212314 A1 Sep. 4, 2008

Related U.S. Application Data

(60) Provisional application No. 60/883,265, filed on Jan. 3, 2007.

(51) Int. Cl.
*F21V 33/00* (2006.01)
(52) U.S. Cl. .................. 362/92; 362/125; 362/604
(58) Field of Classification Search ............ 362/92, 362/125, 126, 133, 559, 555, 560, 600, 608–617, 362/621, 623; 99/341; 312/116, 119
See application file for complete search history.

(56) References Cited

U.S. PATENT DOCUMENTS

| | | | | |
|---|---|---|---|---|
| 4,689,726 A | * | 8/1987 | Kretzschmar | 362/127 |
| 4,903,172 A | * | 2/1990 | Schoniger et al. | 362/612 |
| 5,375,043 A | * | 12/1994 | Tokunaga | 362/601 |
| 5,626,084 A | * | 5/1997 | Kelly et al. | 108/23 |
| 5,902,034 A | * | 5/1999 | Santosuosso et al. | 362/125 |
| 5,915,824 A | * | 6/1999 | Straat | 362/133 |
| 5,987,199 A | * | 11/1999 | Zarian et al. | 385/31 |
| 6,042,244 A | * | 3/2000 | Witkoski | 362/133 |
| 6,210,013 B1 | * | 4/2001 | Bousfield | 362/92 |
| 6,231,205 B1 | * | 5/2001 | Slesinger et al. | 362/133 |
| 6,283,608 B1 | * | 9/2001 | Straat | 362/133 |
| 6,289,150 B1 | * | 9/2001 | Zarian et al. | 385/31 |
| 6,612,710 B2 | * | 9/2003 | Suzuki et al. | 362/600 |
| 7,121,675 B2 | | 10/2006 | Ter-Hovhannisian | |
| 7,163,305 B2 | | 1/2007 | Bienick | |
| 7,172,327 B2 | * | 2/2007 | Kuo | 362/609 |
| 7,180,252 B2 | | 2/2007 | Lys et al. | |
| 7,221,104 B2 | | 5/2007 | Lys et al. | |
| 7,240,506 B2 | | 7/2007 | Grassmuck et al. | |
| 7,330,632 B1 | | 2/2008 | Buelow, II et al. | |
| 7,374,327 B2 | * | 5/2008 | Schexnaider | 362/613 |
| 7,434,951 B2 | | 10/2008 | Bienick | |
| 7,497,600 B2 | | 3/2009 | Sekela et al. | |
| 7,505,123 B2 | | 3/2009 | Benoit et al. | |
| 7,513,637 B2 | | 4/2009 | Kelly et al. | |

(Continued)

*Primary Examiner*—Hargobind S Sawhney
(74) *Attorney, Agent, or Firm*—Foley & Lardner LLP

(57) ABSTRACT

A temperature controlled case is disclosed that includes a housing defining a display area and a first shelf provided within the display area. The temperature controlled case also includes a light system associated with the first shelf. The light system includes a substrate having a first portion and a second portion and a light source provided at the first portion of the substrate and configured to direct light through the substrate towards the second portion for illuminating an area below the first shelf. According to another embodiment, the substrate is a light sheet that cooperates with the light source to provide a distribution of light that varies between the first portion of the light sheet and the second portion of the sheet.

22 Claims, 5 Drawing Sheets

U.S. PATENT DOCUMENTS

| | | | |
|---|---|---|---|
| 7,549,783 | B2 | 6/2009 | Cassarly et al. |
| 7,559,672 | B1 | 7/2009 | Parkyn et al. |
| 2003/0038571 | A1* | 2/2003 | Obrock et al. .............. 312/408 |
| 2006/0232993 | A1 | 10/2006 | Cassarly et al. |
| 2006/0242981 | A1 | 11/2006 | Grassmuck et al. |
| 2006/0245205 | A1 | 11/2006 | Hughes et al. |
| 2007/0109764 | A1 | 5/2007 | Bienick |
| 2007/0151274 | A1 | 7/2007 | Roche et al. |
| 2007/0159820 | A1 | 7/2007 | Crandell et al. |
| 2007/0171647 | A1 | 7/2007 | Artwohl et al. |
| 2007/0180842 | A1 | 8/2007 | LaRose, Jr. |
| 2007/0188427 | A1 | 8/2007 | Lys et al. |
| 2007/0195535 | A1 | 8/2007 | Artwohl et al. |
| 2007/0247831 | A1 | 10/2007 | Buelow, II et al. |
| 2007/0247835 | A1 | 10/2007 | Buelow, II et al. |
| 2008/0055913 | A1 | 3/2008 | Sekela et al. |
| 2008/0151535 | A1 | 6/2008 | De Castris |
| 2008/0158858 | A1 | 7/2008 | Madireddi et al. |
| 2008/0165526 | A1 | 7/2008 | Saraiji et al. |
| 2008/0219002 | A1 | 9/2008 | Sommers et al. |
| 2009/0040769 | A1 | 2/2009 | Parkyn et al. |
| 2009/0091271 | A1 | 4/2009 | Zulim et al. |
| 2009/0174300 | A1 | 7/2009 | Jousse et al. |
| 2009/0213579 | A1 | 8/2009 | Saraiji et al. |
| 2009/0219720 | A1 | 9/2009 | Reed |
| 2009/0322202 | A1 | 12/2009 | Auday et al. |

* cited by examiner

LIGHT SYSTEM FOR A TEMPERATURE CONTROLLED CASE

CROSS-REFERENCE TO RELATED PATENT APPLICATIONS

This application claims the benefit under 35 U.S.C. 119(e) of U.S. Provisional Application No. 60/883,265, having a filing date of Jan. 3, 2007, titled "Light System for a Temperature Controlled Case," the complete disclosure of which is hereby incorporated by reference.

BACKGROUND

The present disclosure relates to a light system for a temperature controlled case. The present disclosure more specifically relates to a light system for illuminating a display area within a temperature controlled case. The present disclosure more specifically relates to a light system incorporated into a shelving system of the temperature controlled case which is capable of directing light to various locations within the case.

It is known to provide a temperature controlled case (e.g., refrigerated case, freezer, merchandiser, etc.) for the storage and presentation of food products (such as perishable meat, dairy, seafood, produce, etc.). Such known temperature controlled cases may include those of a type having one or more substantially horizontal support surfaces or shelves for the support and presentation of food products. These shelves are provided in a display portion of the temperature controlled case and ideally provide optimum visual and physical accessibility of the food products by the consumer.

In an effort to optimize the visual accessibility of the food products, the display area of the refrigerated case is often illuminated by an artificial light source provided within the display area. Known light sources include conventional incandescent light bulbs, fluorescent tubes, and light emitting diodes (LEDs) located along one or more of the internal sides of the refrigerated case or under one or more of the shelves of the refrigerated case. These conventional light systems tend to provide localized illumination with the display portion and typically offer limited flexibility when designing product displays.

Accordingly, it would be advantageous to provide an improved light system for a temperature controlled case. It would also be advantageous to provide a light system capable of providing uniform or otherwise controlled distribution of light within a display portion of a temperature controlled case. It would also be advantageous to provide a light system incorporated into a shelving system of a temperature controlled case capable of uniformly illuminating an area below the light system. It would also be advantageous to provide a light system incorporated into a shelving system of a temperature controlled case capable of selectively illuminating an area below the light system. It would be further advantageous to provide a light system incorporated into a shelving system of a temperature controlled case that does not generate a substantial amount of heat within the display portion. It would further be advantageous to provide a light system capable of redirecting light within a display portion of a temperature controlled case.

Accordingly, it would be advantageous to provide a temperature controlled case and/or a light system having any one or more of these or other advantageous features.

SUMMARY

According to one embodiment a temperature controlled case includes a housing defining a display area and a first shelf provided within the display area. The temperature controlled case also includes a light system associated with the first shelf. The light system includes a substrate having a first portion and a second portion and a light source provided at the first portion of the substrate and configured to direct light through the substrate towards the second portion for illuminating an area below the first shelf.

According to another embodiment a temperature controlled case includes a housing defining a display area and a first shelf provided within the display area. The temperature controlled case also includes a light system associated with the first shelf and configured to illuminate an area below the first shelf. The light system includes a light sheet having a first portion and a second portion, and a light source provided at the first portion of the light sheet and configured to direct light through the light sheet towards the second portion. The light sheet and the light source cooperate to provide a distribution of light that varies between the first portion of the light sheet and the second portion of the sheet.

According to another embodiment a temperature controlled case includes a housing defining a display area and a first shelf provided within the display area. The temperature controlled case also includes a light system associated with the first shelf. The light system includes a light panel having a rear end and a front end, an array of light emitting diodes provided at the rear end of the light panel and configured to direct light through the light panel towards the front end of the light panel, and a reflector supported at the front end of the light panel. At least two of the light panel, the light emitting diodes and the reflector cooperate to provide a distribution of light to an area below the first shelf that is greater at the front end of the light panel than at the rear end of the light panel.

DETAILED DESCRIPTION

Before proceeding with the description of the exemplary and alternative embodiments of the temperature controlled case and light system, it should be noted that references to "front," "rear," "upper," and "lower" in this description are merely used to identify the various elements as they are oriented in the Figures, with "front" and "rear" being relative to the positioning of the temperature controlled case in which the light system is used. These terms are not meant to limit the element which they describe, as the various elements may be oriented differently in various temperature controlled cases and light systems.

Further, for purposes of this disclosure, the term "coupled" means the joining of two members directly or indirectly to one another. Such joining may be stationary in nature or moveable in nature and/or such joining may allow for the flow of fluids, electricity, electrical signals, or other types of signals or communication between the two members. Such joining may be achieved with the two members or the two members and any additional intermediate members being integrally formed as a single unitary body with one another or with the two members or the two members and any additional intermediate members being attached to one another. Such joining may be permanent in nature or alternatively may be removable or releasable in nature.

It should also be noted that while the light system will be described herein with reference to a temperature controlled case, and more specifically a refrigerated case 10, the light system is suitable for use with any type of display case having at least one shelf for supporting a product. For example, the light system may also be suitable for use with a non-refrigerated display device (e.g. produce stand, merchandise rack, case holder, compartment system, storage bins, etc.). Further, the light system may be used with temperature controlled display devices having a closed front with doors or other access openings provided in the rear of the device and a gravity type cooling coil therein, or with devices of a type having doors on the front for direct access to the products by consumers, or with devices having an open top and a "well" for storage of products, or with devices designed to provide for a "low" temperature (e.g. frozen) storage and display of products or for a "medium" temperature (e.g. chilled, refrigerated, etc.) storage and display of products. Further still, the light system may be used for both new construction and existing or retro-fit applications.

Figure 1:
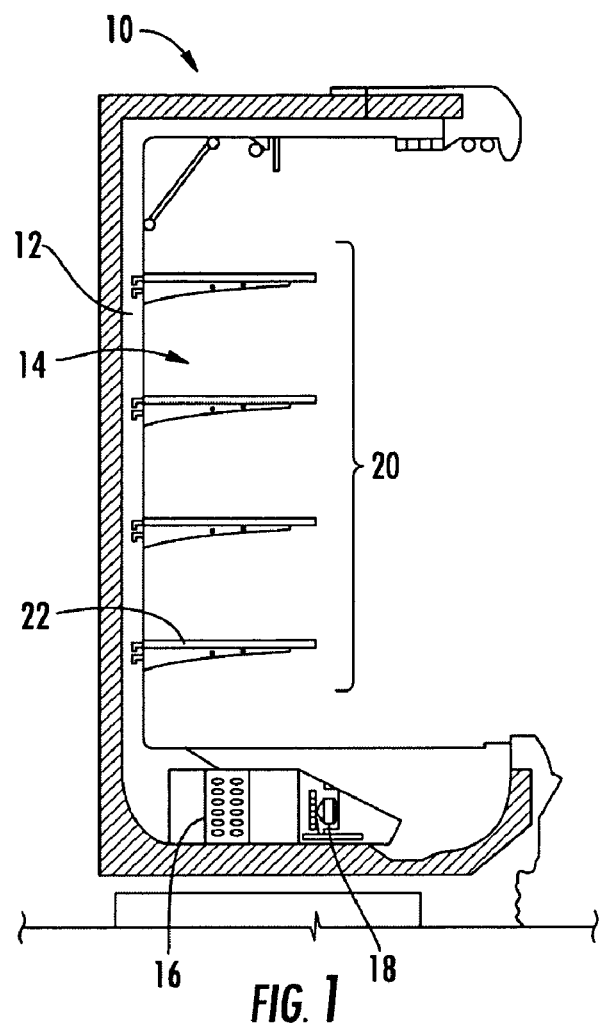
FIG. 1 is a schematic image of a side elevation view of a temperature controlled case according to an exemplary embodiment.

Referring to FIG. 1, a temperature controlled case, shown as a refrigerated case 10, is provided according to an exemplary embodiment. Refrigerated case 10 is a typical front-loading case of the open front type (e.g., "reach-in," "self-service," etc.) utilizing an air curtain with one or more layers of air for maintaining a desired temperature within the case. Refrigerated case 10 is shown having a base or housing 12 which defines an airspace or display area 14 that is configured to receive products or objects (e.g. perishable food products, meats, diary, produce items, frozen items, etc.). To maintain display area 14 at a desired temperature, refrigerated case 10 includes a cooling system having one or more cooling elements 16 (e.g., coils, finned-coils, heat exchangers, flow-through pans, etc.) that are configured to cool air circulated within display area 14 by a fan 18.

Figure 2:
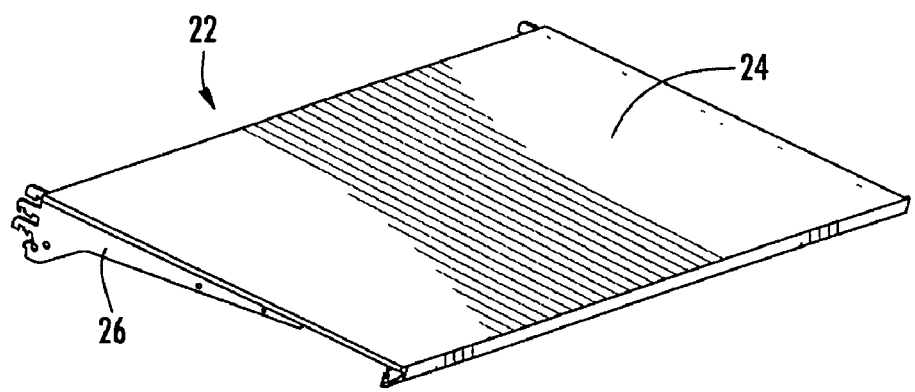
FIG. 2 is a schematic image of a top perspective view of a display shelf according to an exemplary embodiment.
Figure 3:
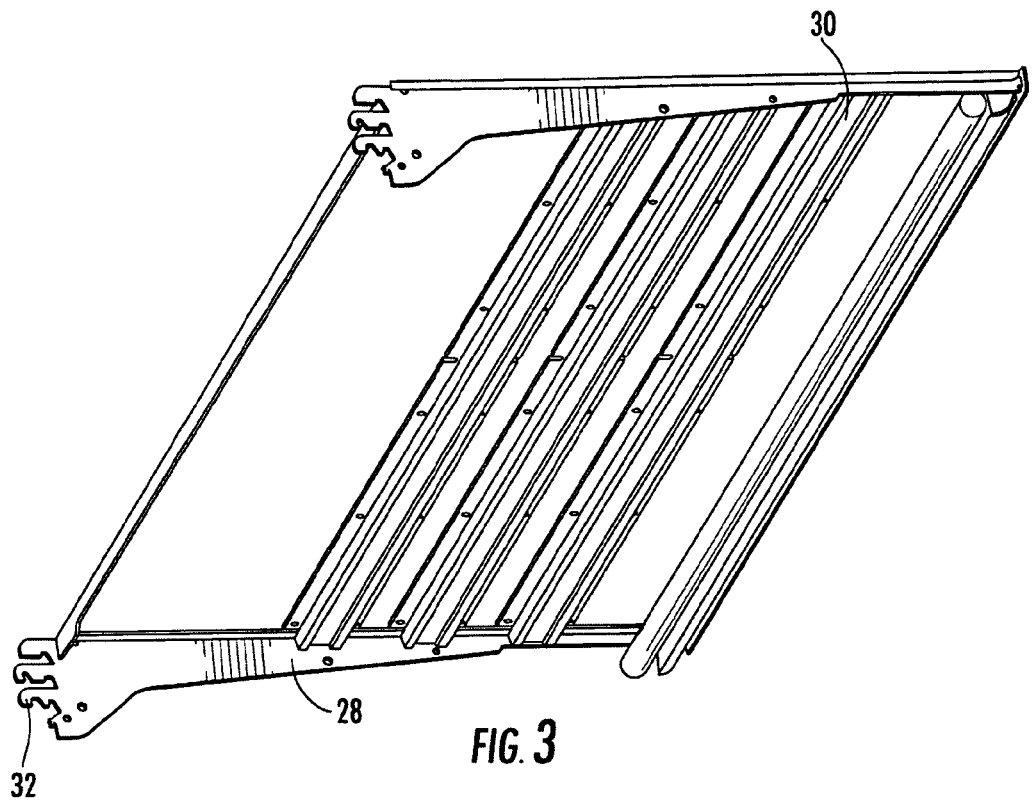
FIG. 3 is a schematic image of a bottom perspective view of the display shelf of FIG. 2.
Figure 4:
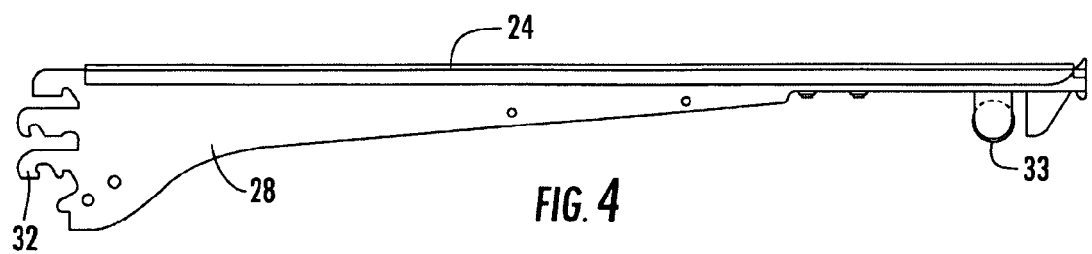
FIG. 4 is a schematic image of a side elevation view of the display shelf of FIG. 2.

Provided within display area 14 is a shelving system 20. Shelving system 20 provides for the organizational support and display of the products and is shown as including a plurality of display shelves 22 stacked or otherwise arranged in a vertical direction. Referring to FIGS. 2 through 4, each display shelf 22 includes a support surface (e.g., ledge, shelf, etc.), shown as a substantially planar platform 24, and a support structure (e.g., base, bracket, etc.), shown as a support frame 26. Platform 24 is a substantially rigid member that may be formed of any of a variety of suitable materials (e.g., glass, resins, composite materials, metals, etc.). Depending on the particular application, platform 24 may be formed as a substantially opaque member (thereby preventing light from one shelving area to reach a second shelving area) or a substantially transparent or translucent member (thereby at least partially allowing light from one shelving area to reach a second shelving area) or anywhere therebetween (e.g., a partially opaque member, a partially transparent or translucent member, etc.).

According to an exemplary embodiment, support frame 26 is a separate structure from platform 24 and is shown as including a pair of lateral side rails 28 and a plurality of cross-support members 30 extending in a lateral direction between the side rails 28. According to various alternative embodiments, one or more of the components of support frame 26 may be integrally formed with platform 24 to provide a single one-piece unitary body.

Display shelves 22 may be fixedly coupled to housing 12 or may be detachably coupled to housing 12. Detachably coupling display shelves 22 to housing 12 may allow the number and/or positioning of shelves within display area 14 to be selectively arranged or reconfigured so that shelving system 20 is adaptable to accommodate products of varying sizes. To detachably coupled display shelves 22 to housing 12, a mounting system (not shown) is provided. The mounting system includes a plurality of apertures or openings arranged in a predetermined pattern that are configured to detachably receive projections (e.g., fingers, etc.), shown as tabs 32, supported at support frame 26.

To highlight or otherwise improve the visibility of the products supported on display shelf 22, a light system 60 (shown in FIGS. 5-9) is provided. Light system 60 is configured to illuminate portions of display area 14 and the products being displayed therein. Light system 60 allows for improved control of the distribution and intensity of light within a temperature controlled case and may be used alone or in combination with a conventional light system (e.g., incandescent and florescent bulbs, etc.). An example of a conventional light system is shown in FIGS. 3 and 4 (i.e., a single florescent bulb 33 provided at a front bottom edge of display shelf 22).

Referring generally to FIGS. 5 through 9, light system 60 is shown according to various exemplary embodiments. Light system 60 generally comprises a medium or conduit for light (e.g., substrate, light guide, member, sheet, etc.), shown as a light panel 62 and a light source 64. Light panel 62 includes at least one light radiating portion (e.g., a bottom surface, etc.) and at least one light receiving portion (e.g., a rear side edge, etc.). Light is emitted from light source 64 into the light receiving portion of light panel 62 and travels internally along light panel 62 until exiting from the light radiating portion of light panel 62. Such a system allows for the uniform or otherwise controlled distribution of light generated by a single light source to various locations within refrigerated case 10.

According to an exemplary embodiment, light panel 62 is a substantially rigid and transparent member formed of a material (e.g., glass, quartz, resin, etc.) suitable for acting as a medium or guide for light so that light emitted at a first portion of the panel can be irradiated at a second portion of the panel. According to one exemplary embodiment, light panel 62 is formed of a resin, such as an acrylic sheet, and is configured to receive light at an edge and irradiate light from at least a lower or bottom surface. Light panel 62 may be a commercially available light panel, such as those commercially available from Fawoo Technology of Korea, Lumitex, Inc. of Strongsville, Ohio, or any other manufacturer, or may be specifically configured for use with refrigerated case 10.

Figure 5:
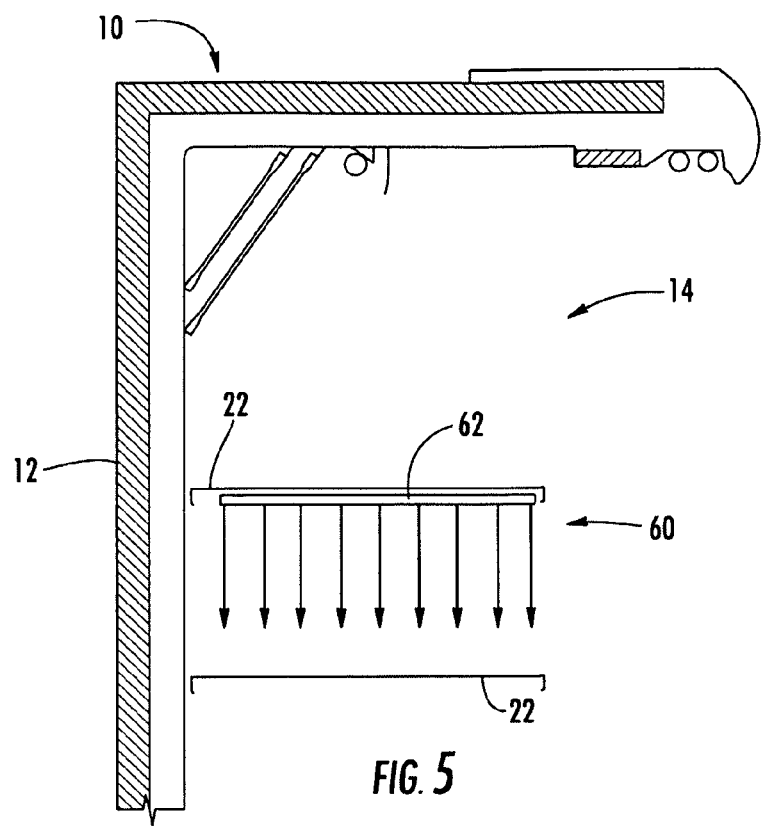
FIG. 5 is a schematic image of a partial side elevation view of the temperature controlled case of FIG. 1 having a display shelf with a light system shown according to an exemplary embodiment.

Referring to FIG. 5 in particular, light system 60 is shown according to an exemplary embodiment in combination with refrigerated case 10. According to the embodiment illustrated, light system 60 is used in conjunction with shelving system 20 to illuminate products supported within display area 14. In particular, light panel 62 of light system 60 is shown as being coupled to a first display shelf 22 and configured to distribute light across a second display shelf 22 which is located immediately below light panel 62 and the first display shelf 22. According to an exemplary embodiment, light panel 62 is configured to evenly distribute light across second display shelf 22. As detailed below, light panel 62 may also be used to illuminate one or more additional areas within display area 14 (e.g., a product support area of the first display shelf 22 which is located above light panel 62, etc.).

According to an exemplary embodiment, light panel 62 is supported near display shelf 22 and may directly or indirectly coupled to display shelf 22. For example, light panel 62 may be directly coupled to platform 24 and/or support frame 26 of display shelf 22. Any known or otherwise suitable technique may be used to couple light panel 62 to display shelf 22. For example, light panel 62 may be coupled to display shelf 22 using a mechanical fastener (e.g., bolts, clips, screws, mounting brackets, hangers, etc.), an adhesive, a suitable welding technique (e.g., ultrasonic welding, etc.) or any other suitable technique. According to various alternative embodiments, light panel 62 may be coupled to housing 12 of refrigerated case 10 and supported adjacent to display shelf 22. Further, as detailed below, light panel 62 may be integrally formed with one or more components of display shelf 22.

Figure 6:
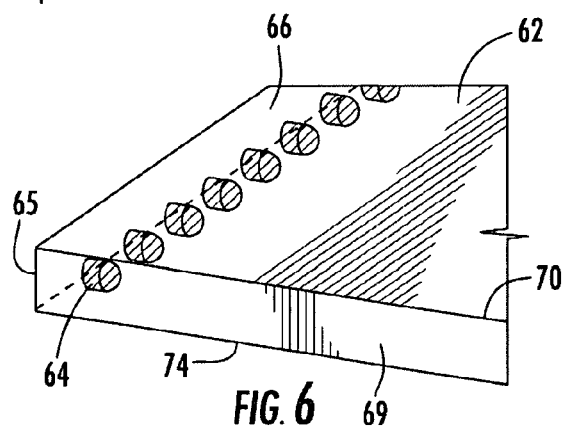
FIG. 6 is a schematic image of a partial perspective view of a light panel of the light system of FIG. 5 according to an exemplary embodiment.
Figure 7:
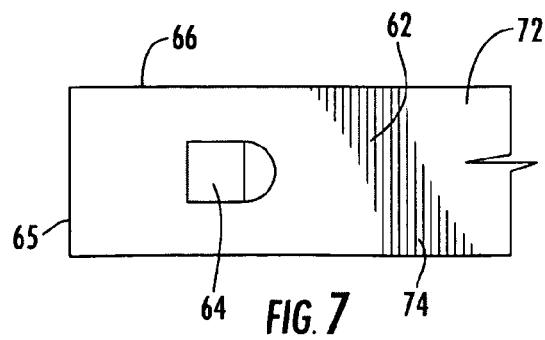
FIG. 7 is a schematic image of a detailed side elevation view of the light panel of FIG. 6.

FIGS. 6 and 7 provide detailed views of light panel 62 of FIG. 5. Light panel 62 includes a first area, shown as a rear portion 66, a second area, shown in FIG. 8 as a front portion 68, a third area, shown as left portion 70, a fourth area, referred to as a right portion (not shown), a fifth area, shown as an upper portion 72, and a sixth area, shown as a lower portion 74. According to an exemplary embodiment, light panel 62 is a substantially rectangular member with rear portion 66 having a rear peripheral surface 65 substantially parallel to a front peripheral surface 67 of front portion 68, left portion 70 having a left peripheral surface 69 substantially parallel to a peripheral surface of the right portion, and upper portion 72 having a top surface 71 substantially parallel to a bottom surface 73 of lower portion 74. The shape of light panel 62 is substantially similar the rectangular shape of display shelf 22 and is sized to occupy a substantial portion of space available under shelf 22. While not shown, light panel 62 is sufficiently sized in a lateral direction so that left portion 70 and the opposite right portion are near the lateral boundaries of display shelf 22. According to various alternative embodiments, light panel 62 have any of a variety of shapes (e.g., circular, triangular, etc.) and/or any of a variety of sizes.

Referring further to FIGS. 6 and 7, light source 64 is shown as being provided along rear portion 66 of light panel 62. While not shown, it should be noted that a power and/or control system is coupled to light source 64 allowing for its operation. According to an exemplary embodiment, light source 64 comprises a one or more light emitting diodes ("LEDs") having light emitting portions configured to direct light into light panel 62, and more specifically into an edge of light panel 62. Any number of LEDs may be provided depending on a variety of design factors (e.g., the size and/or intensity of the LEDs, the size the light panel, the desired light output, etc.).

The LEDs may be provided in any of a variety of colors (e.g., white, blue, red, green, etc.) or combinations of colors. According to an exemplary embodiment, it may be desirable to illuminate products supported within display area 14 with white light. However, with current technology, it is often more cost effective to use blue LEDs than white LEDs and to convert the blue light to white light. To convert blue light to white light, a phosphor coated LED can be used. According to an exemplary embodiment, phosphor may be added (e.g., embedded, etc.) directly to light panel 62 so that a blue light entering light panel 62 will be converted to a white light. Such a configuration may advantageously reduce costs in comparison to using phosphor coated LEDs to create white light.

It should be noted that while light source 64 is described herein as being one or more LEDs, light source 64 may be any known or otherwise suitable light source capable of emitting light at a surface of light panel 62 (e.g., incandescent bulbs, florescent bulbs, etc.). Further, it may be desirable to have light source 64 generate more than one color of light.

According to the embodiment illustrated, the LEDs are shown as an array extending across a rear portion of light panel 62 in a single row. This single row of LEDs is sufficient to generate enough light so that light introduced to light panel 62 by the LEDs can be irradiated along lower portion 74 of light panel 62 uniformly between rear portion 66 and front portion 68. The LEDs are shown as being positioned at rear portion 66 forward of rear peripheral surface 65 of light panel 62. According to the embodiment illustrated, the LEDs are embedded or otherwise disposed within light panel 62 with a light emitting portion of the LEDs facing in a forward direction. The LEDs may be embedded into light panel 62 during the manufacturing of light panel 62 or may be embedded into light panel 62 after manufacturing of light panel 62 (e.g., by being inserted into openings within the light panel, etc.).

According to various alternative embodiments, light source 64 may be supported at an outer periphery edge of light panel 62. For example, the array of LEDs may be supported rearward of rear peripheral surface 65 of light panel 62 with a light emitting portion of the LEDs facing in a forward direction. According to such an embodiment, the LEDs may be provided as a module (e.g., unit, etc.) separate from light panel 62. A suitable mounting structure (e.g., bracket, clip, etc.) may be used to support the LED module adjacent to rear portion 66. The mounting structure may provide for the permanent or detachable coupling of the LED module to light panel 62. Detachably coupling the LED module to light panel 62 may allow the LED module to be readily interchanged with another module which may be beneficial when servicing light system 60 (e.g., to replace an inoperative module with a an operative module, etc.) and/or when refrigerated case 10 is to receive a different product display (e.g., a LED module having a first color scheme could be interchanged with an LED module having second color scheme, etc.).

Figure 10:
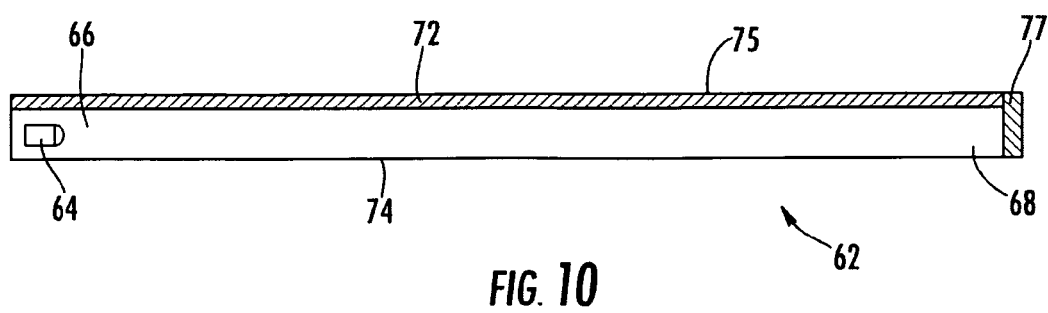
FIG. 10 is a schematic image of a side elevation view of the light panel of FIG. 6 with reflective members according to another exemplary embodiment.

To allow light to exit bottom surface 73 of light panel 62 between rear peripheral surface 65 and front peripheral surface 67 in a substantially uniform manner, light panel 62 may have any of a variety of features for directing or guiding the light received from light source 64. For example, a light refracting layer (e.g., member, coating, etc.) may be provided at upper portion 72 of light panel 62 and/or along one or more the peripheral edges. The light refracting layer may be in the form of paint applied to upper portion 72 in a predetermined pattern. For example, one or more lines, dots or any other shape (or combination of shapes) may be painted on upper portion 72 for directing the light as it passes through light panel 62. Other features that may be used to control the distribution of light exiting light panel 62 include, but are not limited to, surface prints, sheet materials, surface etching with chemicals, mechanical cuts or notches in one of more of the surfaces of light panel 62, a light panel with an extruded profile, and/or a light panel having a tapered or otherwise varying shape. Referring to FIG. 10, the light refracting layer is shown according to an exemplary embodiment as a substantially uniform layer 75.

If light source 64 emits light into a first edge of light panel 62 (e.g., rear peripheral surface 65, etc.), a portion of the light will escape or exit an opposite second edge of light panel 62 (e.g., front peripheral surface 67, etc.) if a light refracting feature is not provided at that second edge. Depending on the particular application, allowing light to exit an edge opposite its point of entry into light panel 62 may or may not be desirable. Preventing or at least minimizing the amount of light exiting an edge opposite its point of entry into light panel 62 may increase the intensity of light exiting another portion of light panel 62.

Referring back to FIG. 5, in such an exemplary embodiment, it is desirable to prevent light from exiting front peripheral surface 67 in an effort to increase the intensity of light exiting bottom surface 73. To prevent light from exiting front peripheral surface 67 a feature is provided which reflects light otherwise exiting front peripheral surface 67 back into light panel 62. According to an exemplary embodiment, a mirror is provided along front peripheral surface 67. The mirror recycles light that does not exit lower portion 74 on a first pass by redirecting such light back into light panel 62. The mirror may be provided by a component that is coupled to front peripheral surface 67 or by a coating that is applied to front peripheral surface 67. Referring again to FIG. 10, a reflective layer 77 is shown as being applied at front peripheral surface 67 to direct light back into light panel 62.

Figure 8:
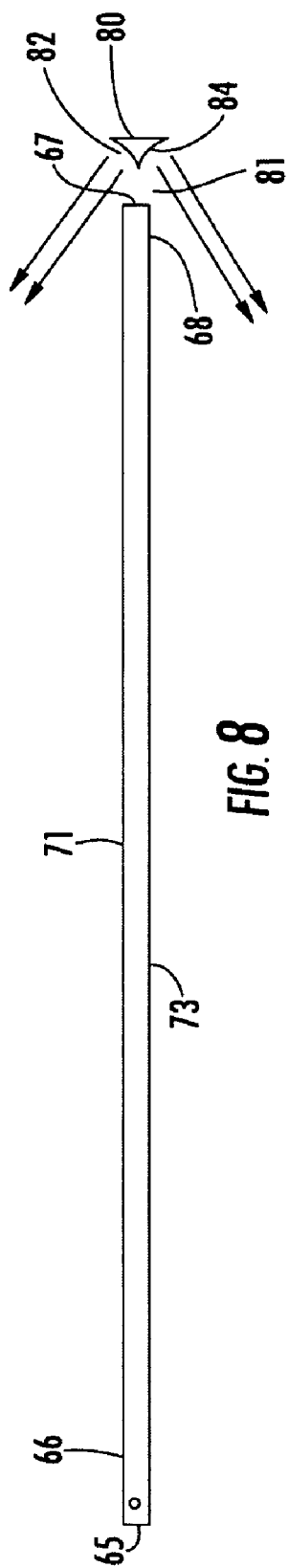
FIG. 8 is a schematic image of a side elevation view of the light panel of FIG. 6 with a reflective member according to an exemplary embodiment.

As mentioned above, in certain applications it may be desirable to allow light to exit an edge opposite its point of entry into light panel 62. Light exiting such an edge may be used to illuminate another area within refrigerated case 10 and/or may be used for other aesthetic purposes (e.g., to provide an illuminated line along the end of display shelf 22, etc.). Referring to FIG. 8, light system 60 is shown according to another exemplary embodiment. In such an embodiment, light system 60 allows light to exit an edge opposite its point of entry into light panel 62, but includes a component (e.g., reflective element, etc.), shown as reflector 80, for redirecting such light to another area within display area 14.

According to the embodiment illustrated, a gap 81 is provided between reflector 80 and the edge of light panel 62 from which the light is exiting. Gap 81 is sufficiently sized so that the light can be redirected to a desired area within display area 14. According to various alternative embodiments, gap 81 may be eliminated depending on the configuration of reflector 80.

According to the embodiment illustrated, reflector 80 includes a first reflective surface 82 and a second reflective surface 84. First reflective surface 82 is configured to redirect light exiting front peripheral surface 67 towards products supported on the display shelf 22 located above light panel 62, while second reflective surface 84 is configured to redirect light exiting front peripheral surface 67 towards products supported on the display shelf 22 located below light panel 62. According to the embodiment illustrated, first reflective surface 82 is substantially a mirror image of second reflective surface 84, with both first reflective surface 82 and second reflective surface 84 having a curvilinear (e.g., parabolic, etc.) profile.

According to the embodiment illustrated, first reflective surface 82 is integrally formed with second reflective surface 84 to provide a single one-piece unitary body. According to various alternative embodiments, a support structure or frame may be provided for supporting first reflective surface 82 relative to second reflective surface 84.

According to various exemplary embodiments, reflector 80 may include only one reflective surface for either redirecting light to the display shelf 22 located above light panel 62 or to the display shelf 22 located below light panel 62. According to further alternative embodiments, reflector 80 may include more than two reflective surfaces for redirecting light. According to still further alternative embodiments, the reflective surfaces may have any of a variety of profiles depending on how the light is to be directed. For example, one or more of first reflective surface 82 and second reflective surface 84 may be provided a substantially flat or straight member.

According to an exemplary embodiment, reflector 80 is permanently coupled relative to display shelf 22 with first reflective surface 82 fixed relative to second reflective surface 84. Reflector 80 may be coupled to display shelf 22 and/or light panel 62 using any known or otherwise suitable technique. For example, reflector 80 may be coupled to display shelf 22 using a mechanical fastener (e.g., bolts, clips, screws, mounting brackets, hangers, etc.), an adhesive, a suitable welding technique (e.g., ultrasonic welding, etc.) or any other suitable technique.

According to another exemplary embodiment, reflector 80 is permanently coupled relative to display shelf 22 with first reflective surface 82 and/or second reflective surface 84 being adjustable (e.g., adaptable, reconfigurable, etc.) relative to light panel 62 and/or relative to each other. Allowing first reflective surface 82 and/or second reflective surface 84 to be adjustable allows an user (e.g., product display manager, etc.) to adjust the position of first reflective surface 82 and/or second reflective surface 84 depending on the products being display. For example, if a relatively tall product is being displayed, it may be desirable to adjust the corresponding reflective surface so that light is redirected at a greater angle relative to light panel 62 than if a shorter product is being displayed. Since the size of products being displayed may vary along the width of display shelf 22, first reflective surface 82 and/or second reflective surface 84 may be segmented in a lateral direction so that a user can adjust the angle of a reflective surface at a first lateral side of display shelf 22 independently of a reflective surface at a second lateral side of display shelf 22. Such configurations may provide flexibility in designing product displays.

According to further exemplary embodiment, reflector 80 may be detachably coupled to display shelf 22. For such a configuration reflector 80 may be designed as a unit or module configured to be selectively added or removed by a user. More than one reflector module may be provided, with each reflector module having different light reflecting properties. For example, a first reflector module may be configured to redirect light onto an area located below light panel 62, a second reflector module may be configured to redirect light onto an area located above light panel 62, and a third reflector module may be configured to redirect light onto areas located both above and below light panel 62 thereby allowing a user to selectively interchange the modules depending on the products being displayed. According to a similar variation, a first module may be configured to redirect light at a first intensity and a second module may be configured to redirect light at a lesser second intensity. A user may selectively use the first module to highlight a first product and the second module to draw less attention to a second product.

Figure 9:
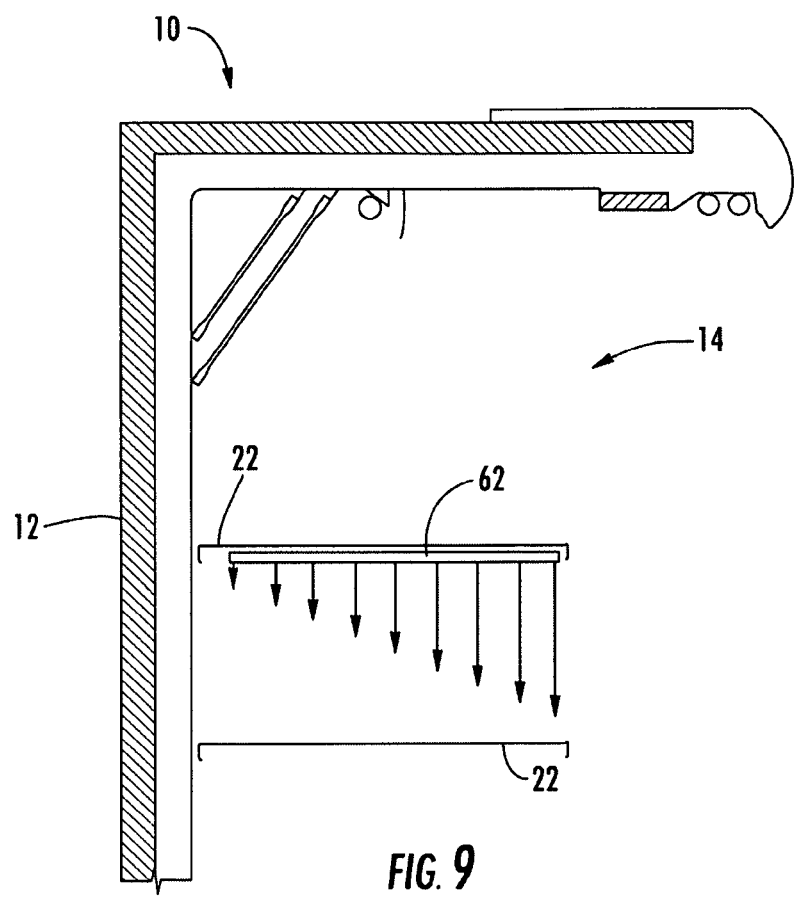
FIG. 9 is a schematic image of a partial side elevation view of the temperature controlled case of FIG. 1 having a display shelf with a light system shown according to another exemplary embodiment.

For certain applications, it may be desirable to allow more light to exit one portion of light panel 62 than another portion. Referring to FIG. 9, a light system 60 capable of providing a variable light gradient along light panel 62 is shown according to an exemplary embodiment. Such a configuration may be used to highlight one product supported on display shelf 22 over another product supported on the same display shelf. Such a configuration may also be used in an effort to conserve energy by selectively lighting certain areas rather than an entire area and/or at least by selectively lighting one area at a first intensity and a second area at a lesser second intensity.

Referring further to FIG. 9, light system 60 is configured to distribute more light at the front portion of refrigerated case 10 than at the rear portion of refrigerated case 10. According to the embodiment illustrated, the variable light gradient extending between rear portion 66 and front portion 68 of light panel 62 is a substantially linear gradient and is provided along substantially the entire width of light panel 62. According to various alternative embodiments, the light gradient extending between rear portion 66 and front portion 68 may be any of a variety of configurations depending on the application. For example, the variable light gradient may be a substantially continuous parabolic gradient which increases light intensity towards either the front or rear of display shelf 22. According to another alternative embodiment, the variable light gradient may be discontinuous at one or more points and/or include a combination of linear and curvilinear portions. According to a further alternative embodiment, the light gradient may vary along the width of shelf 22.

To vary the light gradient along the depth and/or width of light panel 62, any of light refracting features discussed above may be used including, but not limited to a light refracting layer (e.g., member, coating, etc.), surface prints, surface etching with chemicals, mechanical cuts or notches in one of more of the surfaces of light panel 62, a light panel with an extruded profile, and/or a light panel having a tapered or otherwise varying shape.

According to another exemplary embodiment, light panel 62 may function as the display shelf itself or at least be incorporated into the display shelf such that top surface 71 of light panel 62 provides the support surface for the products displayed with refrigerated case 10. For such an embodiment, light panel 62 is a substantially rigid member suitable for supporting products and has an outer surface that is substantially impervious to fluid and relatively easy to maintain (e.g., clean, etc.).

It is important to note that the construction and arrangement of the elements of refrigerated case 10 and light system 60 provided herein are illustrative only. Although only a few exemplary embodiments of the present inventions have been described in detail in this disclosure, those skilled in the art who review this disclosure will readily appreciate that many modifications are possible in these embodiments (such as variations in features such as components, light refracting features, shelf configurations, display case configurations, reflector configurations; variations in sizes, structures, shapes, dimensions and proportions of the components of the system, use of materials, combinations of shapes, etc.) without materially departing from the novel teachings and advantages of the inventions. For example, the light system may be adapted for use in a wide variety of commercial or institutional applications, including supermarkets, farm markets, hotels, restaurants, cafeterias, convenience stores, delis, food-service kitchens, etc. and may be provided in any number, size, orientation and arrangement to suit the particular product storage and display requirements of the installation location. Further, it is readily apparent that variations of the light system and its components and elements may be provided in a wide variety of types, shapes, sizes and performance characteristics, or provided in locations external or internal to the display device. Accordingly, all such modifications are intended to be within the scope of the inventions.

The order or sequence of any process or method steps may be varied or re-sequenced according to alternative embodiments. Any means-plus-function clause is intended to cover the structures described herein as performing the recited function and not only structural equivalents but also equivalent structures. Other substitutions, modifications, changes and omissions may be made in the design, operating configuration and arrangement of the preferred and other exemplary embodiments without departing from the spirit of the inventions as expressed herein.

What is claimed is:

1. A temperature controlled case comprising:
   a housing defining a display area;
   a first shelf provided within the display area; and
   a light system associated with the first shelf, the light system comprising:
   a substrate having a first edge portion and a second edge portion;
   a light source disposed proximate the first edge portion of the substrate and configured to direct light through the substrate for illuminating an area below the first shelf; and
   a reflector disposed at least partially along the second edge portion of the substrate and configured to direct light exiting the second edge portion of the substrate toward at least one of an area above the first shelf and the area below the first shelf.

2. The temperature controlled case of claim 1 wherein the reflector comprises a plurality of reflector modules, each having different reflective characteristics, that are configured to be detachably coupled to the second edge portion of the substrate.

3. The temperature controlled case of claim 1 wherein the reflector includes a first surface for directing light exiting the second edge portion of the substrate to the area above the first shelf and a second surface for directing light exiting the second edge portion of the substrate to the area below the first shelf.

4. The temperature controlled case of claim 3 wherein at least one of the first surface and the second surface of the reflector is a curved surface.

5. The temperature controlled case of claim 1 wherein the substrate is a panel having a shape corresponding to a shape of the first shelf.

6. The temperature controlled case of claim 5 wherein the panel is substantially rectangular in shape and sized substantially the same as a footprint of the first shelf.

7. The temperature controlled case of claim 1 wherein the substrate is supported below a support surface of the first shelf.

8. The temperature controlled case of claim 1 wherein the substrate constitutes a support surface of the first shelf.

9. The temperature controlled case of claim 1 wherein the light source is an array of light emitting diodes.

10. The temperature controlled case of claim 9 wherein the light emitting diodes are embedded in the first edge portion of the substrate.

11. The temperature controlled case of claim 9 wherein the light emitting diodes are configured to emit blue light, the substrate being configured to convert the blue light into white light.

12. The temperature controlled case of claim 1 wherein the first edge portion of the substrate is provided at a rear end of the first shelf and the second edge portion of the substrate is provided at a front end of the first shelf.

13. The temperature controlled case of claim 1 wherein the substrate is configured to evenly distribute light across the area below the first shelf.

14. A temperature controlled case comprising:
a housing defining a display area;
a first shelf provided within the display area; and
a light system associated with the first shelf and configured to illuminate an area below the first shelf, the light system comprising:
a light sheet disposed at least partially beneath the first shelf and having a first edge and a second edge;
a light source provided proximate the first edge of the light sheet and configured to direct light through the light sheet; and
a reflector proximate the second edge of the light sheet to direct light into the display area.

15. The temperature controlled case of claim 14 wherein the light system further comprises a surface treatment that provides a variable light gradient which distributes more light at a second portion of the light sheet adjacent to the second edge than at a first portion of the light sheet adjacent to the first edge.

16. The temperature controlled case of claim 15 wherein the second edge of the light sheet is associated with a front portion of the first shelf and the first edge of the light sheet is associated with a rear portion of the first shelf.

17. The temperature controlled case of claim 15 wherein the variable light gradient is substantially linear between the first edge of the light sheet and the second edge of the light sheet.

18. The temperature controlled case of claim 14 wherein the light source comprises light emitting diodes, and further comprising a light refracting element provided along an upper portion of the light sheet for guiding the light received by the light emitting diodes.

19. The temperature controlled case of claim 18 wherein the light refracting element is at least one of a reflective coating and a reflective sheet material.

20. A temperature controlled case comprising:
a housing defining a display area;
a first shelf provided within the display area; and
a light system associated with the first shelf, the light system comprising:
a light panel adjacent the first shelf having a rear edge and a front edge;
an array of light emitting diodes provided proximate the rear edge of the light panel and configured to direct light through the light panel towards the front edge of the light panel; and
a reflector supported proximate the front edge of the light panel; the reflector configured to direct light exiting the front edge of the light panel to at least one of an area above the first shelf and the area below the first shelf;
wherein at least two of the light panel, the light emitting diodes and the reflector cooperate to provide a distribution of light to an area below the first shelf that is greater proximate the front edge of the light panel than proximate the rear edge of the light panel.

21. The temperature controlled case of claim 20 wherein the reflector is configured to direct light at the front edge of the light panel back into the panel.

22. The temperature controlled case of claim 20 wherein the reflector comprises a first light reflecting surface configured to direct light exiting the front edge of the light panel to an area above the first shelf and a second light reflecting surface configured to direct light exiting the front edge of the panel to the area below the first shelf.

* * * * *